3,010,991

CATALYTIC ESTERIFICATION OF AROMATIC CARBOXYLIC ACIDS

Delbert H. Meyer, Highland, Ind., assignor to Standard Oil Company, Chicago, Ill., a corporation of Indiana No Drawing. Filed Jan. 22, 1959, Ser. No. 788,277
9 Claims. (Cl. 260—475)

This invention relates to the esterification of aromatic carboxylic acids with primary aliphatic alcohols. More particularly, the invention relates to improved catalysts for this reaction.

Esters of aliphatic alcohols and aromatic carboxylic acids are widely used in industry, particularly as plasticizers and as intermediates in the preparation of polyester resins. The rate of esterification is usually quite slow and catalysts have been used to increase this reaction rate. The commonly used active catalysts such as sulfuric acid, hydrochloric acid, and aluminum sulfate promote rapid reaction rates but have the serious drawback in that they lead to considerable alcohol loss by ether formation.

An object of the invention is to provide a catalytic process for esterifying aromatic carboxylic acids with primary aliphatic alcohols. A particular object of the invention is a catalytic process for the esterification of aromatic carboxylic acids with primary aliphatic alcohols wherein there is no significant loss of alcohol to ether formation. Other objects will become apparent in the course of the detailed description.

In accordance with the objects above, it has now been discovered that rapid reaction rates may be attained without substantial ether production by esterifying aromatic carboxylic acids (or anhydrides thereof) with primary aliphatic alcohols in the presence of a catalyst selected from the group cobalt oxides, copper oxides, manganese oxides, cobalt salts of acids having ionization constants lower than $10^{-3}$, copper salts of acids having ionization constants lower than $10^{-3}$, and manganese salts of acids having ionization constants lower than $10^{-3}$.

The catalyst of the invention may comprise one or more of the following suggested compounds. The list is not exhaustive.

Cobalt oxides:
- $CoO$
- $Co_2O_3$

Cobalt salts of weak acids:
- $Co(acetate)_2 \cdot 4H_2O$
- $Co(benzoate)_2 \cdot 4H_2O$ Copper oxides:
- $Cu_2O$
- $CuO$ Copper salts of weak acids:
- $Cu(oxalate) \cdot \frac{1}{2}H_2O$
- $Cu(acetate)$ Manganese oxides:
- $MnO$
- $MnO_2$ Manganese salts of weak acids:
- $Mn(acetate)_2 \cdot 4H_2O$
- $MnCO_3$ Certain of the above catalysts, particularly the cobaltous, cupric, and manganous acetates, appear to be somewhat superior materials, both in terms of effectiveness and handling ease.

The improved catalysts of this invention are useful in increasing the reaction rate of all aromatic carboxylic acids or anhydrides thereof with primary aliphatic alcohols which contain from 1 to about 16 carbon atoms.

Examples of suitable aromatic carboxylic acids are: benzoic, toluic, phthalic, phthalic anyhdride, isophthalic, terephthalic, trimesic, trimellitic, trimellitic anhydride, hemimellitic, hemimellitic anyhdride, prehnitic, mellitic, naphthoic, naphthalic anhydride, diphenic, diphenic anhydride.

Suitable primary aliphatic alcohols are: methanol, ethanol, n-propanol, n-butanol, isobutyl, n-hexyl, n-octyl, lauryl, myristyl (n-dodecyl), cetyl (n-hexadecyl), isooctyl ($C_8$ Oxo), nonyl ($C_9$ Oxo), decyl ($C_{10}$ Oxo) and tridecyl ($C_{13}$ Oxo). As used herein Oxo alcohols are understood to be the product of the reaction of an olefin or mixture of olefins with carbon monoxide and subsequent hydrogenation of the aldehydes formed in the oxoation reaction. Many of these Oxo alcohols are now commercial products; the 8, 9, 10 and 13 carbon atom containing mixture of alcohols derived from a mixture of $C_7$, $C_8$, $C_9$ and $C_{12}$ olefin isomers respectively are available as isooctyl alcohol, nonyl alcohol, decyl alcohol and tridecyl alcohol, respectively. The catalysts of the instant invention are particularly suitable for reacting phthalic acids with methanol.

Although it is to be understood that the cobalt, copper, or manganese catalysts of the invention are suitable for use with the defined acids and alcohols at various well known conditions of temperature, time of reaction, and ratios of alcohol to acid in the starting reaction mixture, for completeness a summary of operating conditions is set out herein. The esterification reaction is ordinarily conducted at a temperature between about 140° C. and 350° C. and at pressures ranging upwards from atmospheric. The reaction is carried out until the desired degree of conversion of carboxyl groups or equilibrium condition has been reached. This time is dependent upon the particular acid and particular alcohol present in the reaction zone. In general, the higher the temperature maintained in the reaction zone the shorter the time needed to reach the desired degree of carboxyl group conversion or equilibrium condition.

Theoretically only 1 mol of alcohol is needed for each mol of carboxyl groups to be esterified, however, the degree of conversion and the conversion rate are improved by the presence of excess alcohol in the reaction zone. In general between about 2 and 30 mols of alcohol are present in the reaction zone per mol of carboxyl groups to be esterified.

The amount of catalyst present may be very small, for example, 0.0005 weight percent based on aromatic acid or anhydride charged to the reaction zone. Or the amount used may be quite large amounting to five or more weight percent based upon acid or anhydride charged. Most catalysts form slurries in the reaction zone; however, it is theorized that the actual catalytic effect is obtained by the very small amounts of the catalysts which are physically dissolved in the liquid material present in the reaction zone. When operating with terephthalic acid and methanol the catalyst usage is generally between about 0.01 and 0.5 weight percent of catalyst based on reactants.

As a specific illustration of a preferred embodiment of the invention, conditions for esterifying the terephthalic acid with methanol are described. The terephthalic acid and methanol are charged to the reaction zone in a weight ratio of methanol to acid of between about 2 and 5; this corresponds to between 10 and 26 mols of methanol per mol of terephthalic acid charged. It is preferred to carry out the esterification reaction at a temperature between about 240° C. and 300° C. The amount of catalyst present appears to have no significant effect on the reaction rate as long as some catalyst is present. A carboxyl group conversion of about 90–95% of equilibrium is attained in a time of between about 10 minutes and 60 minutes, with the longer times corresponding to lower temperatures.

Various embodiments of the invention will be illustrated in the following examples.

EXAMPLE I

Studies were made on the degree of conversion of terephthalic acid and methanol at a standard temperature of about 210° C. and a standard time without and with cobaltous acetate tetrahydrate present. These studies were carried out using as the reaction zone a glass tube having about 13.5 ml. volumetric space. The terephthalic acid and catalyst were weighed and the methanol was delivered volumetrically using a hypodermic syringe. The glass tube was then sealed by fusing the opening. The sealed tube was placed in a constant temperature bath provided with a rocking and oscillating mechanism which mechanism kept the contents of the tube well intermingled. After the reaction zone had been agitated in the bath for the desired time it was removed from the bath and allowed to cool rapidly to room temperature. After the tube had reached room temperature it was opened and the contents transferred to a beaker; the tube was washed with 100 ml. of ethyl alcohol and 100 ml. of benzene to insure removal of all the material therefrom. The degree of conversion of the carboxyl groups to ester groups was determined by titration with 0.02 normal aqueous sodium hydroxide using phenol red as the indicator; when it was believed that the conversion would be low, by presence of considerable solid material in the tube, the titration was carried out with 0.1 normal sodium hydroxide.

The presence of even small amounts of dimethyl ether in the tube is readily detected by the presence of pressure within the tube when the tube is opened. Escaping gaseous material at the moment of opening the tube is quite apparent. Using this method of observation it is believed that no dimethyl ether was formed during the tests made and reported herein.

The results of two tests are reported in the table. In both of the tests, 3 parts by weight of methanol were present for each part of terephthalic acid (TPA). These tests were carried out at about 210° C. and for 64 minutes.

*Table 1.—Cobalt acetate*

| Test No. | Reactants, Parts by Wt. | | Catalyst Wt. percent on TPA | Temp., ° C. | Time, min. | Carboxyl Groups Converted, percent |
|---|---|---|---|---|---|---|
| | Methanol | TPA | | | | |
| 1 | 3 | 1 | None | 210 | 64 | 39 |
| 2 | 3 | 1 | 1 | 211 | 64 | 59.6 |

Test 2, employing the cobalt acetate catalyst of the invention, shows that 59.6 of the carboxyl groups were converted, whereas in Test 1, without catalyst, only 39% of the groups were converted.

EXAMPLE II

In this example, a series of tests was conducted to study the effects of manganous acetate tetrahydrate as an esterification catalyst. The basic experimental procedure followed that outlined in Example I. Tests 1 and 2 herein were conducted using a 3:1 methanol-TPA ratio at about 210° C. for 64 minutes. Tests 3 and 4 used a 4:1 methanol-acid ratio, a temperature of 260° C. and time of 20 minutes. Tests 5–8 employed the same methanol-acid ratio and temperature as in Tests 3 and 4, but the catalyst concentration was reduced and the reaction times varied in order to follow the course of the reaction. Results are shown below:

*Table 2.—Manganese acetate*

| Test No. | Reactants, Parts by Wt. | | Catalyst Wt. percent on TPA | Temp., ° C. | Time, min. | Carboxyl Groups Converted, percent |
|---|---|---|---|---|---|---|
| | Methanol | TPA | | | | |
| 1 | 3 | 1 | None | 210 | 64 | 39 |
| 2 | 3 | 1 | 1 | 211 | 64 | 58 |
| 3 | 4 | 1 | 1 | 260 | 20 | 86.8 |
| 4 | 4 | 1 | 0.25 | 260 | 5 | 32 |
| 5 | 4 | 1 | 0.25 | 260 | 10 | 80 |
| 6 | 4 | 1 | 0.25 | 260 | 20 | 90 |
| 7 | 4 | 1 | 0.25 | 260 | 30 | 94 |

Comparing Test 1 without catalyst and Test 2 with 1% $Mn(Ac)_2\ 4H_2O$ on TPA, it is apparent that substantially more esterification occurred when catalyst was present. In Tests 4–7, where only 0.25% catalyst was used, it is noted that manganous acetate promotes rapid esterification during initial portion of the run and retains its effectiveness in later portions. In none of the tests was any significant amount of ethers formed.

EXAMPLE III

In this example, tests were conducted to study cupric acetate as catalyst for the esterification of terephthalic acid with methanol. The experimental procedure followed that outlined in Example I. Conditions for Tests 1 and 2 were 3:1 methanol:TPA weight ratio, 210° C., and 64 minutes. Conditions for Tests 3–7 were 4:1 methanol:TPA weight ratio, a temperature of 260° C., and times ranging from 5 to 60 minutes. The following results were obtained:

*Table 3.—Copper acetate*

| Test No. | Reactants, Parts by Wt. | | Catalyst Wt. percent on TPA | Temp., ° C. | Time, min. | Carboxyl Groups Converted, percent |
|---|---|---|---|---|---|---|
| | Methanol | TPA | | | | |
| 1 | 3 | 1 | None | 210 | 64 | 39 |
| 2 | 3 | 1 | 1.0 | 210 | 64 | 49 |
| 3 | 4 | 1 | 0.25 | 260 | 5 | 9.3 |
| 4 | 4 | 1 | 0.25 | 260 | 15 | 75 |
| 5 [1] | 4 | 1 | 0.25 | 260 | 20 | [1] 87.5 |
| 6 | 4 | 1 | 0.25 | 260 | 30 | 93.8 |
| 7 | 1 | 1 | 0.25 | 260 | 60 | 95.2 |

[1] By interpolation.

At 210° C., cupric acetate increased the carboxyl conversion from 39% (Test 1, without catalyst) to 49% (Test 2, using 1% catalyst).

EXAMPLE IV

In this example, cobalt oxide ($Co_2O_3$) was used in esterifying terephthalic acid with methanol. The previous procedure was employed; conditions were 4:1 methanol:TPA weight ratio, 260° C., and 20 minutes. Results are shown below:

*Table 4.—Cobalt oxide*

| Test No. | Reactants, Parts by Wt. | | Catalyst Wt. percent on TPA | Temp., ° C. | Time, min. | Carboxyl Groups Converted, percent |
|---|---|---|---|---|---|---|
| | Methanol | TPA | | | | |
| 1 | 4 | 1 | None | 260 | 20 | 77 |
| 2 | 4 | 1 | 0.25 | 260 | 20 | 85 |

EXAMPLE V

In this example, manganese oxide ($MnO_2$) was used in esterifying terephthalic acid with methanol. Conditions duplicated those in Example IV, and the following results were observed:

*Table 5.—Manganese oxide*

| Test No. | Reactants, Parts by Wt. | | Catalyst Wt. percent on TPA | Temp., ° C. | Time, min. | Carboxyl Groups Converted, percent |
|---|---|---|---|---|---|---|
| | Methanol | TPA | | | | |
| 1 | 4 | 1 | None | 260 | 20 | 77 |
| 2 | 1 | 1 | 0.25 | 260 | 20 | 84 |

From the foregoing presentation, it has been established that cobalt, copper, and/or manganese oxides or their salts of acids having ionization constants lower than $10^{-3}$ at 25° C. are remarkably effective catalysts for esterifying aromatic acids and anhydrides with primary alcohols.

I claim:

1. In a process for preparing dimethyl terephthalate by reacting terephthalic acid with methanol at a temperature between about 140° C. and 350° C. and at a pressure of at least atmospheric, the improvement which comprises carrying out said reaction in the presence of a catalyst selected from the group consisting of cupric oxide, manganous oxide, cupric salts of acids having ionization constants lower than $10^{-3}$, and manganous salts of acids having ionization constants lower than $10^{-3}$.

2. The process of claim 1 wherein said catalyst is cupric oxide.

3. The process of claim 1 wherein said catalyst is a cupric salt.

4. The process of claim 3 wherein said salt is cupric acetate.

5. The process of claim 1 wherein said catalyst is manganous oxide.

6. The process of claim 1 wherein said catalyst is a manganous salt.

7. The process of claim 6 wherein said salt is manganous acetate.

8. A process for preparing dimethyl terephthalate which comprises reacting terephthalic acid and methanol, in a weight ratio of methanol to acid between about 2 and 5, at a temperature between about 240° C. and 300° C., in the presence of between about 0.01 and 0.5 weight percent, based on terephthalic acid, of cupric acetate.

9. Process for preparing dimethyl terephthalate which comprises reacting terephthalic acid and methanol, in a weight ratio of methanol to acid of between about 2 and 5, at a temperature between about 240° C. and 300° C., in the presence of between about 0.01 and 0.5 weight percent, based on terephthalic acid, of manganous acetate.

References Cited in the file of this patent

UNITED STATES PATENTS

| | | |
|---|---|---|
| 2,534,028 | Izard | Dec. 12, 1950 |
| 2,828,290 | Caldwell | Mar. 25, 1958 |
| 2,850,483 | Ballentine et al. | Sept. 2, 1958 |

OTHER REFERENCES

Groggins: "Unit Processes of Organic Synthesis," p. 702, McGraw-Hill, 1958.